US007266635B1

(12) United States Patent
Medina

(10) Patent No.: US 7,266,635 B1
(45) Date of Patent: Sep. 4, 2007

(54) ADDRESS LOOKUP APPARATUS HAVING MEMORY AND CONTENT ADDRESSABLE MEMORY

(75) Inventor: Eitan Medina, Ramat Hasharon (IL)

(73) Assignee: Marvell Semiconductor Israel Ltd., Yokneam (IL)

( * ) Notice: Subject to any disclaimer, the term of this patent is extended or adjusted under 35 U.S.C. 154(b) by 475 days.

(21) Appl. No.: 10/896,730

(22) Filed: Jul. 22, 2004

(51) Int. Cl.
*G06F 12/00* (2006.01)
(52) U.S. Cl. .......................................... 711/108; 365/49
(58) Field of Classification Search ..................... None
See application file for complete search history.

(56) References Cited

U.S. PATENT DOCUMENTS

| | | | | |
|---|---|---|---|---|
| 4,758,982 A | * | 7/1988 | Price | 711/108 |
| 4,799,149 A | * | 1/1989 | Wolf | 711/108 |
| 4,901,360 A | | 2/1990 | Shu et al. | |
| 4,903,268 A | | 2/1990 | Hidaka et al. | |
| 5,056,095 A | | 10/1991 | Horiguchi et al. | |
| 5,127,014 A | | 6/1992 | Raynham | |
| 5,485,595 A | | 1/1996 | Assar et al. | |
| 5,513,135 A | | 4/1996 | Dell et al. | |
| 5,535,226 A | | 7/1996 | Drake et al. | |
| 5,848,076 A | | 12/1998 | Yoshimura | |
| 5,958,068 A | | 9/1999 | Arimilli et al. | |
| 5,958,079 A | | 9/1999 | Yoshimura | |
| 5,959,914 A | | 9/1999 | Gates et al. | |
| 6,000,006 A | | 12/1999 | Bruce et al. | |
| 6,058,047 A | | 5/2000 | Kikuchi | |
| 6,065,141 A | | 5/2000 | Kitagawa | |
| 6,175,941 B1 | | 1/2001 | Poeppelman et al. | |
| 6,237,116 B1 | | 5/2001 | Fazel et al. | |
| 6,295,617 B1 | | 9/2001 | Sonobe | |
| 6,385,071 B1 | | 5/2002 | Chai et al. | |
| 6,414,876 B1 | | 7/2002 | Harari et al. | |
| 6,438,726 B1 | | 8/2002 | Walters, Jr. | |
| 6,457,154 B1 | | 9/2002 | Chen et al. | |
| 6,745,280 B2 | * | 6/2004 | Darnell et al. | 711/108 |
| 6,867,991 B1 | * | 3/2005 | Tezcan et al. | 365/49 |
| 7,051,151 B2 | | 5/2006 | Perego et al. | |
| 7,062,597 B2 | | 6/2006 | Perego et al. | |
| 7,065,622 B2 | | 6/2006 | Donnelly et al. | |
| 2003/0188090 A1 | * | 10/2003 | Darnell et al. | 711/108 |

OTHER PUBLICATIONS

"Memory Built-in Self-repair Using Redundant Words" Schober et al. International Test Conference Proceedings. Publication Date: Oct. 30-Nov. 1, 2001 pp. 995-1001 Inspec Accession No. 7211400.
IBM TDB NN85112562 "System for Efficiently Using Spare Memory Components for Defect Corrections Employing Content-Addressable Memory" Date: Nov. 1, 1985.
"FBDIMM—Unleashing Server Memory Capacity"; Micron Technology, Inc.; 2006; 2 pages.
Bigger, Better, Faster. . . Improve server performance with Crucial fully buffered DIMMS; Andy Heidelberg of Crucial Technology; 6 pages.

* cited by examiner

*Primary Examiner*—Kevin Verbrugge

(57) ABSTRACT

A memory device and method for looking up data corresponding to an input address includes a memory lookup module, memory that communicates with the memory lookup module, and content addressable memory (CAM) that communicates with said memory lookup module.

56 Claims, 7 Drawing Sheets

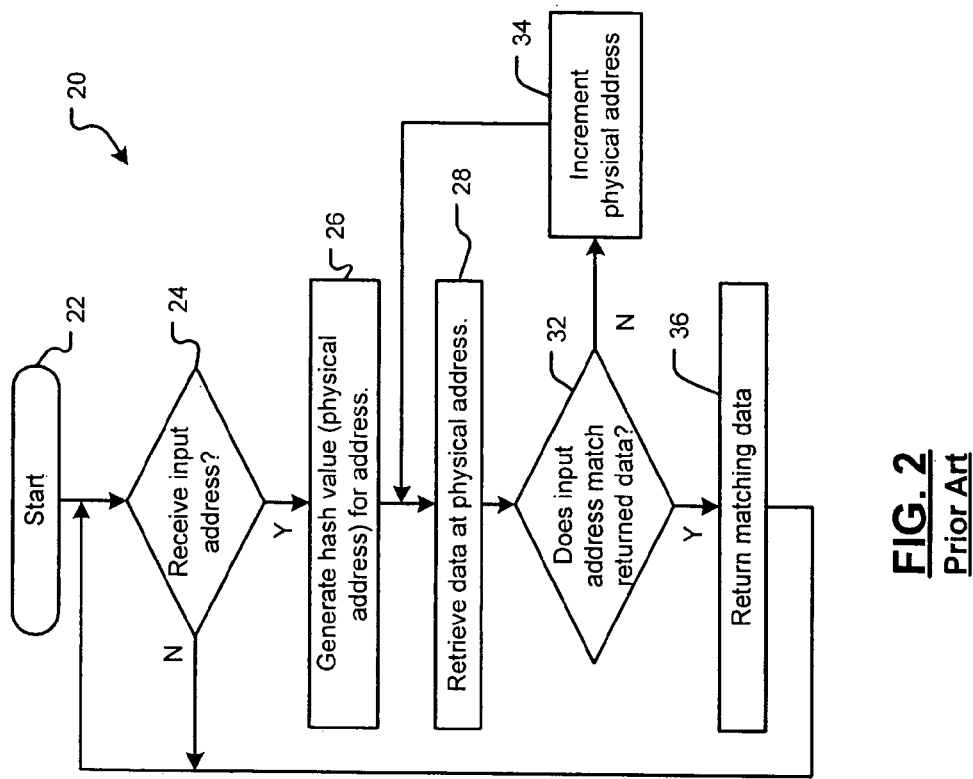
FIG. 2
_Prior Art_
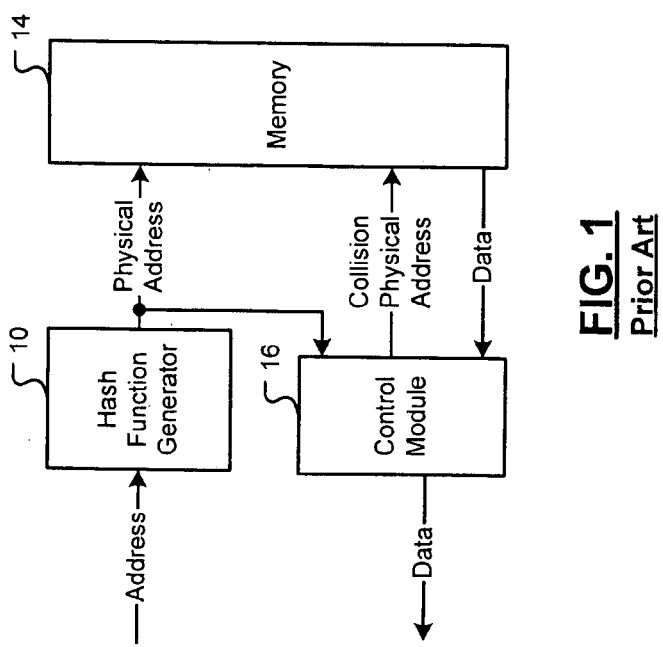
FIG. 1
_Prior Art_
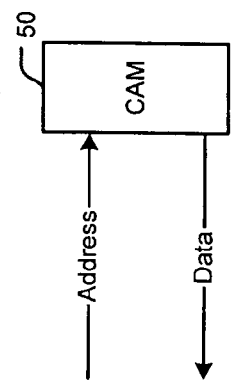
FIG. 3
_Prior Art_

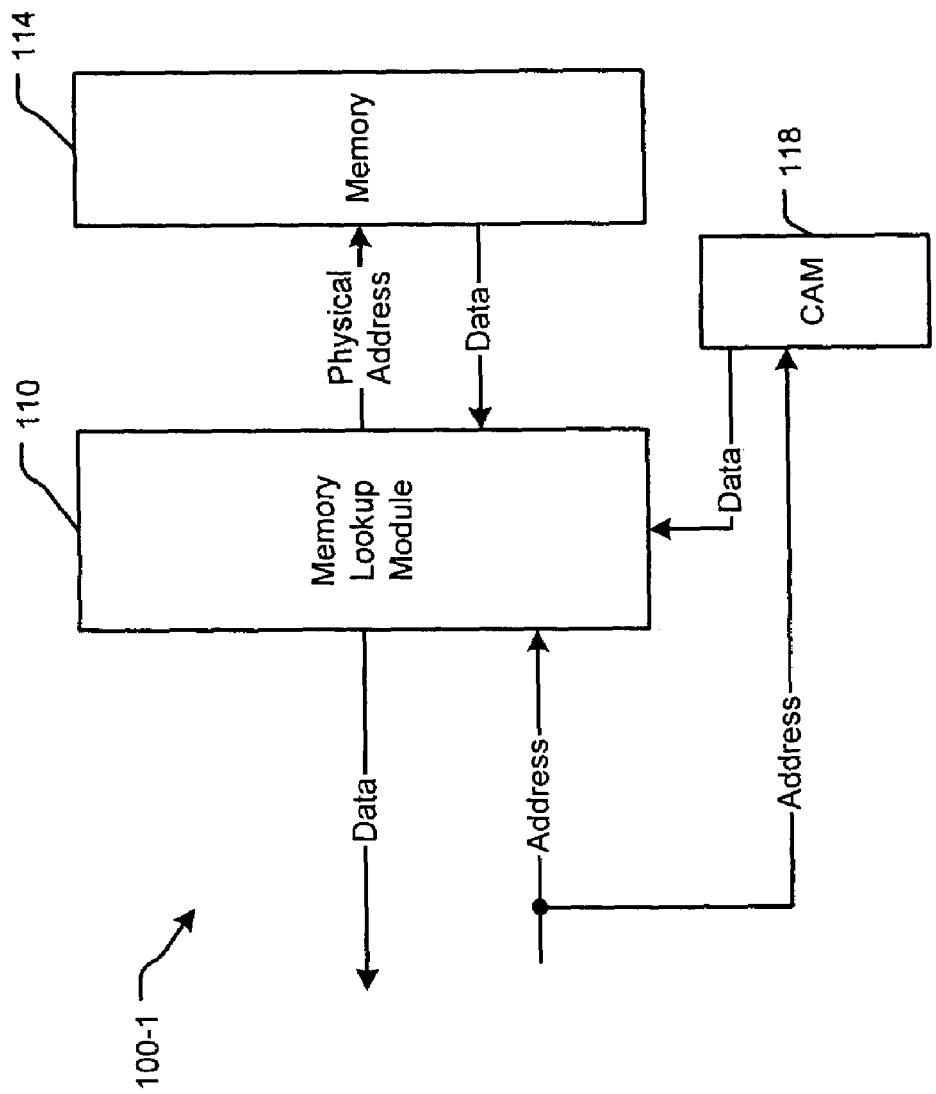

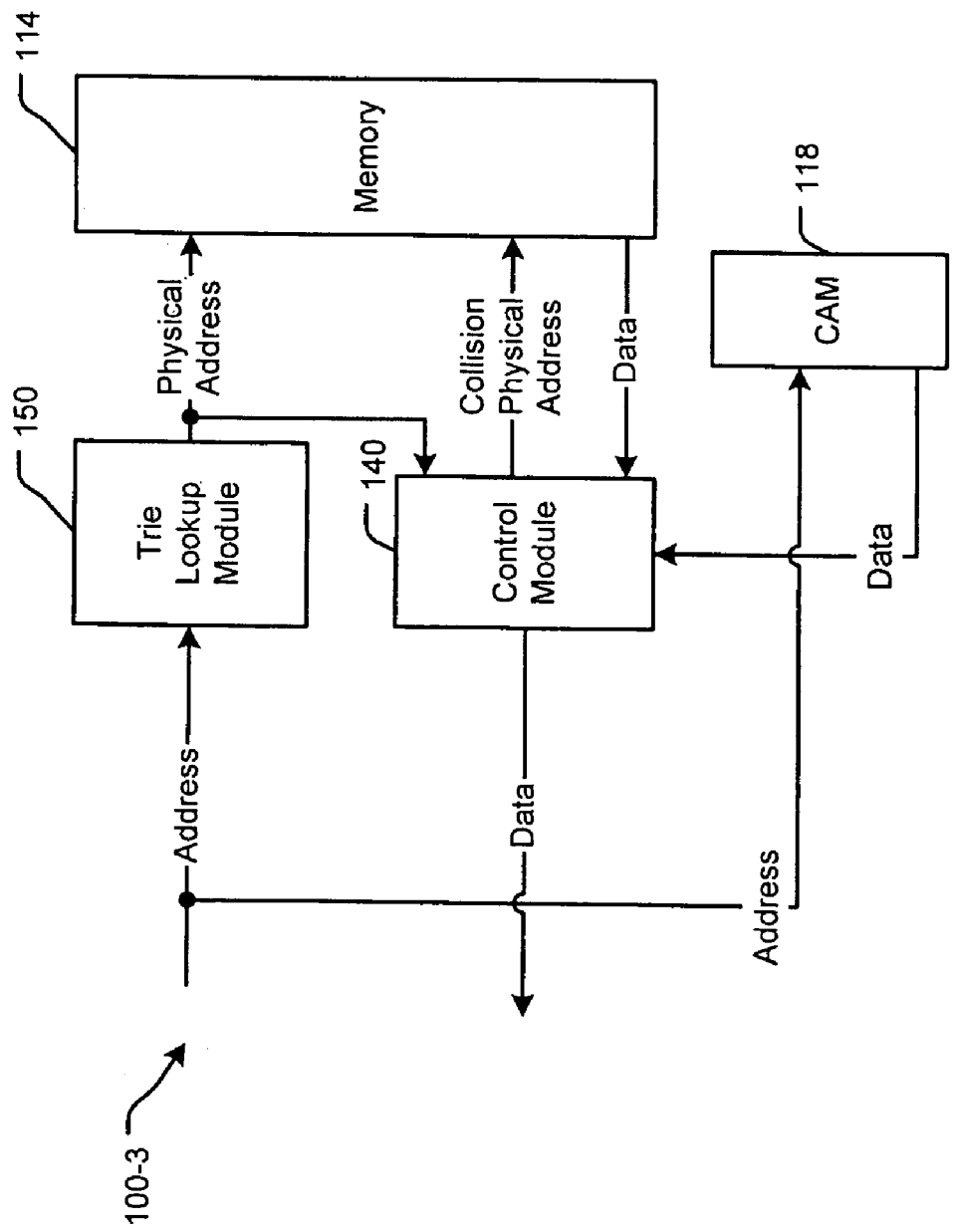

ADDRESS LOOKUP APPARATUS HAVING MEMORY AND CONTENT ADDRESSABLE MEMORY

FIELD OF THE INVENTION

The present invention relates to memory devices, and more particularly to methods and apparatus for addressing memory.

BACKGROUND OF THE INVENTION

When data packets are sent in a network, the data packets are routed from a sending computer through one or more routers and/or switches to a destination computer. Processing of the data packets by the routers typically involves looking up data using a key. For example, the data packet typically includes a destination address of the data packet. Network devices such as routers and switches may use the destination address to lookup a next_hop address of a next router or switch on a path to the destination address. The next_hop value may be any number of things such as the physical port on which the packet should be transmitted in order to reach its destination in the network or some other packet processing direction.

The destination address may include 48 bits. One approach for handling the data lookup by the router or switch uses memory having $2^{48}$ locations. However, this approach is typically impractical due to the cost of the memory and is an inefficient use of memory since the entire address space is not used. Referring now to FIG. 1, another approach uses a hash function generator 10 that generates a hash value based upon the input address, which may be the destination address or any other key. The hash value corresponds to a physical address of the data in memory 14. In the router/switch example, the data includes the destination address and the next_hop address. A comparing module 16 compares the data returned from the physical address to the input address to determine whether there is a match. If a match occurs, the data is returned.

The hash function generator 10, however, does not generate a unique hash value for each of the potential input addresses. For example, the memory location may already be occupied by another input address and its associated next hop. Therefore, the data that is returned by the memory 14 may not match the input address and a "collision" occurs. Collisions increase the amount of time that is required to lookup the data and find a match. When a collision occurs, the physical address is usually incremented by the comparing module 16 and the data at the new physical address is compared to the input address. If a match occurs, the data is returned. If a match does not occur (another collision), the physical address is incremented and the data is retrieved and compared to the input address. The process is repeated until a match occurs or a predefined limit of attempts is reached (at which point the algorithm will halt and the address cannot be learned by the device implementing the hash function).

Referring now to FIG. 2, steps that are performed using the hash function lookup approach are shown generally at 20. Control begins in step 22. In step 24, control determines whether an input address is received. If not, control returns to step 24. If step 24 is true, the hash function generator 10 generates a hash value or physical address for the input address in step 26. In step 28, data is retrieved from the physical address in the memory 14. In step 32, the comparing module 16 determines whether the input address matches the returned data. If not, the physical address is incremented in step 34 and control returns to step 28. If step 32 is true, the matching data is returned in step 34 and control continues with step 24. As can be appreciated, the loop containing steps 28, 32 and 34 may be repeated multiple times when a collision occurs, which may cause delays. This delay may stall the lookup hardware to a point where it cannot keep up with the rate of the incoming traffic and packets may be lost.

Referring now to FIG. 3, another approach employs content addressable memory (CAM) 50, which is physical memory that is designed for matching. Data having an address that matches an input address is returned. The CAM matches the input address bit-by-bit with all entries in the CAM 50 in a parallel fashion (which typically means—in single clock cycle of the CAM device) and returns the first matching address.

The CAM 50 provides guaranteed performance. In other words, the address lookup will take a fixed amount of time. While CAM 50 provides the highest performance, the use of CAM 50 is typically very expensive and consumes more power than the memory 14 that is used for the hash function lookup approach. The hash function lookup approach is less costly, but does not guarantee that the lookup will take a fixed amount of time. In other words, the hash function lookup approach cannot guarantee the number of lookups that will be required. In some applications such as switches and routers in network applications, performance specifications may require guaranteed lookup performance times so that a predetermined wire speed is guaranteed, while maintaining low cost and limiting power consumption.

SUMMARY OF THE INVENTION

A memory device that stores and retrieves data having an input address comprises a memory lookup module and memory that communicates with the memory lookup module. Content addressable memory (CAM) communicates with the memory lookup module. The memory lookup module attempts to store and/or retrieve the data in one at least one of the memory and/or the CAM.

In other features, during data storage, the memory lookup module generates physical addresses based on the input address using a lookup algorithm until either a first one of the physical addresses is empty or a capacity of the lookup algorithm is reached. If the capacity is reached, the data is stored in the CAM. If the capacity is not reached, the data is stored in the memory at the first one of the physical addresses.

In still other features, the lookup algorithm includes a hash function and the capacity is reached when N collisions occur while attempting to store the data in the memory. The lookup algorithm includes a tree-based algorithm and the capacity is reached when a depth of the tree is reached. The lookup algorithm includes a trie-based algorithm and the capacity is reached when a depth of the trie is reached.

In other features, during data retrieval, the input address is input to the CAM and the memory lookup module at approximately the same time. If the CAM does not return matching data, the memory lookup module compares first data from the physical address to the input address and returns the first data if a match occurs. If the memory lookup module does not find a match between the physical address and the first data, the memory lookup module generates a second physical address and compares second data at the second physical address to the input address and returns the second data if a match occurs. If the memory lookup module does not find a match between the input address and the second data, the memory lookup module generates additional physical addresses and compares additional data at the additional physical addresses to the input address until a match occurs or a capacity of a lookup algorithm of the memory lookup module is reached.

In other features, the memory lookup module at least one of increments the physical address, decrements the physical address, adjusts the physical address using an offset, and adjusts the physical address using an algorithm when the match does not occur. The memory includes at least one of DRAM and SRAM.

A network device comprises the memory device. The input address includes a destination address and the data includes a next hop destination address. The network device includes at least one of a switch, a router and a bridge.

In other features, the memory lookup module includes a hash generating module that uses a hash function to generate a physical address based on the input address. The memory lookup module uses a tree data structure to generate a physical address based on the input address. The memory lookup module uses a trie data structure to generate a physical address based on the input address.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a functional block diagram of a hash function lookup device according to the prior art;

FIG. 2 is a flowchart illustrating steps that are performed by the hash function lookup device according to the prior art;

FIG. 3 is a functional block diagram of a content addressable memory lookup device according to the prior art;

FIG. 4A is a functional block diagram of one exemplary hybrid memory address lookup device according to the present invention;

FIG. 4C is a functional block diagram of still another exemplary hybrid memory address lookup device according to the present invention;

DETAILED DESCRIPTION OF THE PREFERRED EMBODIMENTS

Figure 4B:
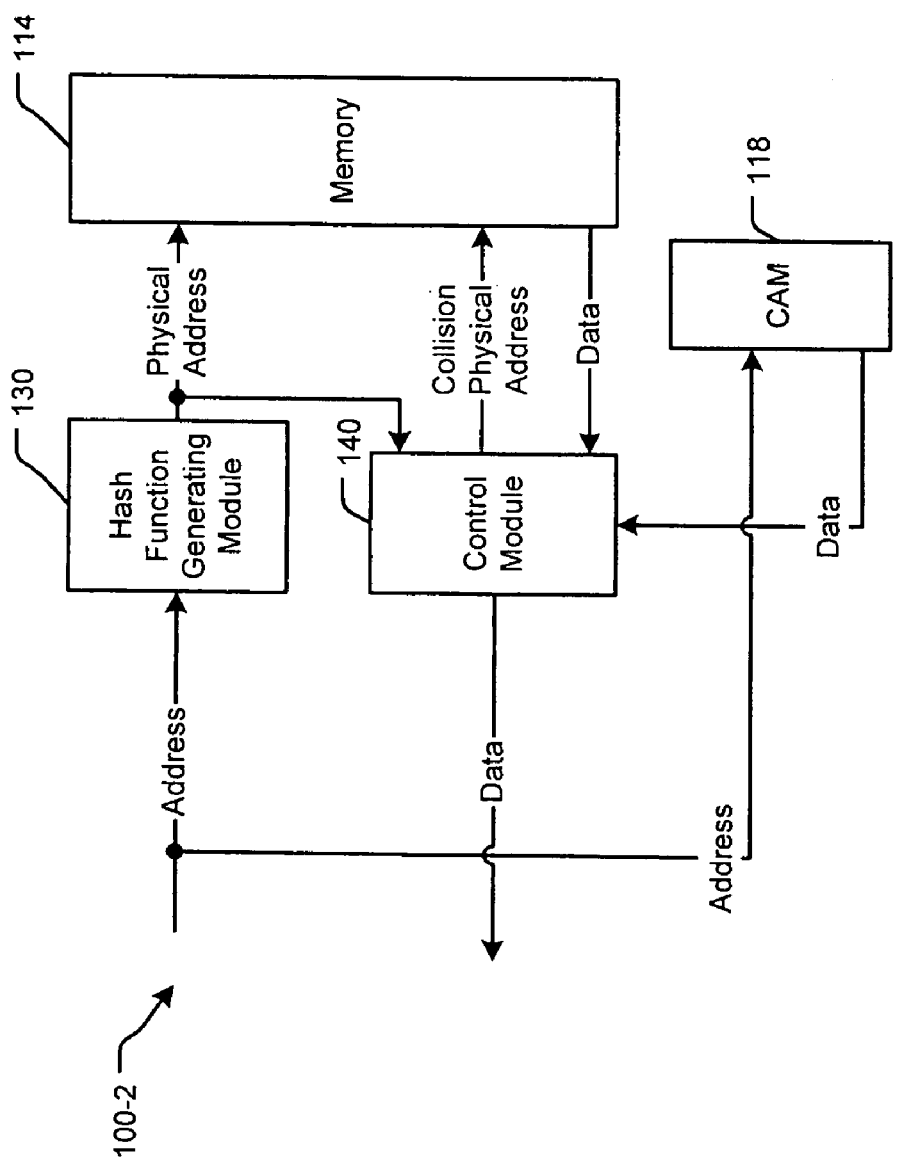
FIG. 4B is a functional block diagram of another exemplary hybrid memory address lookup device according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 4A, a hybrid memory address lookup device according to the present invention is shown generally at 100-1. The memory address lookup device 100-1 includes a memory lookup module 110, memory 114, and content addressable memory (CAM) 118.

When an input address is received, the input address is used to lookup data in the CAM 118. At the same time and/or after the CAM lookup, the input address is input to the memory lookup module 110, which generates a first physical address. If the CAM 118 returns matching data, the memory lookup terminates and data from the CAM 118 is returned. Otherwise, data corresponding to the physical address is returned from the memory 114 to the memory lookup module 110, which compares the address in the data to the input address. If a match occurs, the data is returned.

If a match does not occur, the memory lookup module 110 adjusts the physical address to a second physical address and data is returned from the second physical address to the memory lookup module 110. The memory lookup module 110 determines whether the address of the data from the memory 114 matches the input address. The process repeats until a match occurs or (optionally) until predefined limit N is reached, at which point the algorithm will stop in order to have a constrained lookup time. The physical address may be incremented or decremented by one, incremented or decremented by an offset and/or adjusted using other approaches such as tree-based lookup algorithms.

Referring now to FIGS. 4B and 4C, other exemplary hybrid memory address lookup devices according to the present invention are shown generally at 100-2 and 100-3. The memory lookup module 110 may include a hash generating module 130 and a control module 140 as shown in FIG. 4B. The hash generating module 130 generates a hash value or the first physical address. If the data at the first physical address matches, the data is returned. Otherwise, the control module 140 generates a different physical address as described above and the process repeats until the data matches and/or N attempts occur. In this case, the hash function has a capacity of N. In some implementations, the control module 140 may be integrated with one of the other components 110, 114, 118 and 130 of the hybrid memory address lookup device 100.

Referring now to FIG. 4C, the memory lookup module 110 may also include a tree-based lookup module 150 and the control module 140. For example, one tree-based lookup module 150 includes a trie lookup or VL_trie (Variable length trie) lookup that is typically found in Internet Protocol version 4 (IPv4) routers. Another tree-based lookup module 150 includes a tree data structure. The tree-based lookup module 150 generates the first physical address. If the data at the first physical address matches, the data is returned. Otherwise, the control module 140 generates a different physical address as described above and the process repeats until the data matches and/or N attempts occur. In some implementations, the control module 140 may be integrated with one of the other components 110, 114, 118 and 150 of the hybrid memory address lookup device 100. In binary tries, the value of successive bits in the address determines a path from the root to lower search levels. A binary trie is a tree with paths determined by the data that is stored. Both trie and tree data structures typically have a maximum depth or capacity.

Each of the disclosed memory devices utilize different ways for inserting addresses into memory and for searching the memory during use. The memory lookup module 110 typically has a greater than 1:1 relationship between the input address space and the address locations of the memory 114. The memory lookup modules suffer from lack of predictability in the memory utilization and capacity (but still with relatively reasonable statistical performance, and lower cost and power than CAM).

Figure 5:
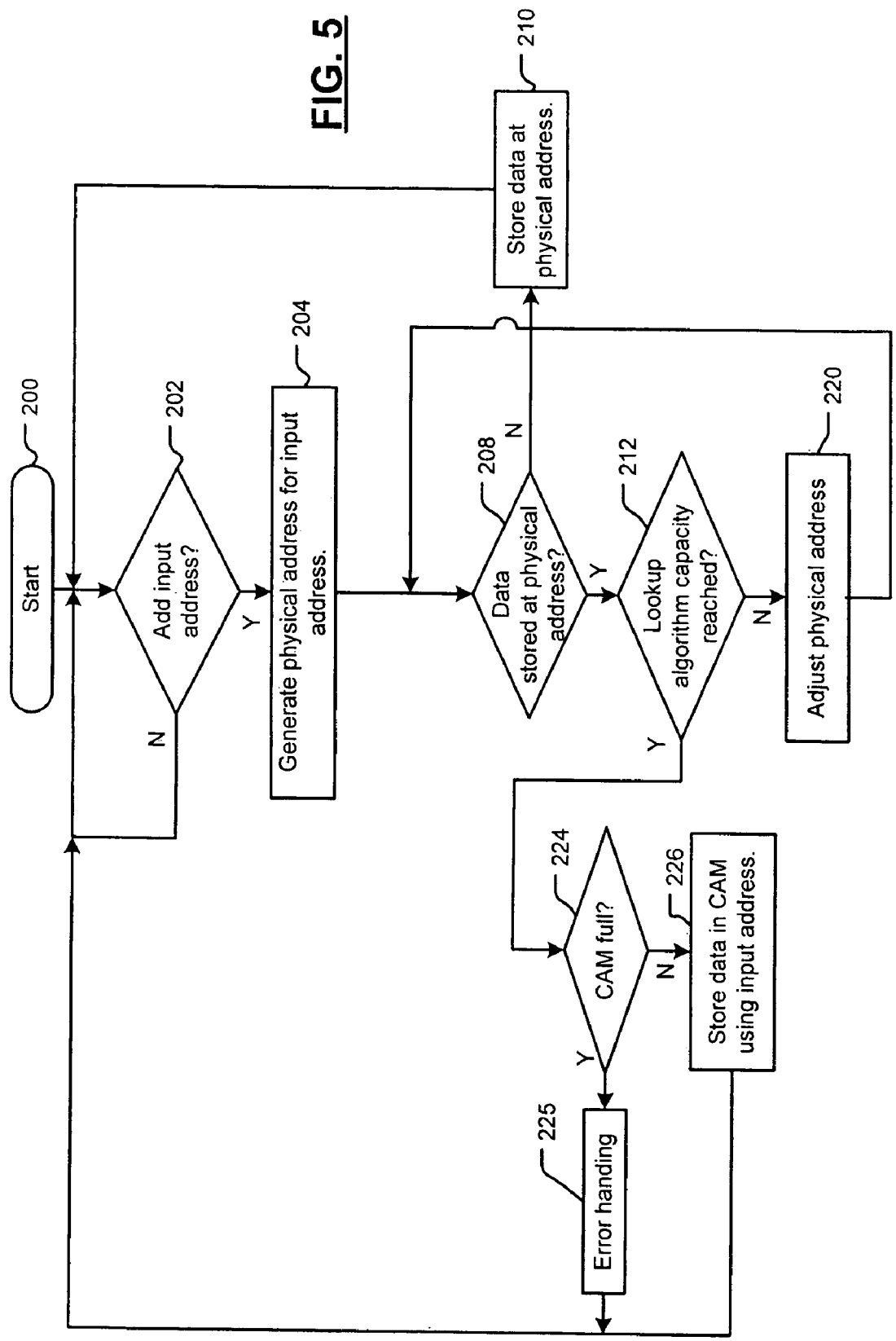
FIG. 5 is a flowchart illustrating learning steps that are performed by the hybrid memory address lookup device of FIGS. 4A–4C.

Referring now to FIG. 5, learning steps that are executed by the hybrid memory address lookup device 100 are shown. Control begins in step 200. In step 202, control determines whether an input address needs to be added to the hybrid memory address lookup device 100. If not, control returns to step 202. If step 202 is true, the memory lookup module 110 uses a lookup algorithm to generate a physical address for the input address in step 204. In step 208, control determines whether there is data stored at the physical address. If step 208 is false, control stores data at the physical address in step 210 and continues with step 202. If step 208 is true, control determines whether the capacity of the lookup algorithm is reached. For example, if a hash function is used, capacity may be reached after N collisions. For trie and tree data structures, capacity is reached when the trie or tree depth is reached. Other lookup algorithms may have other capacity criteria.

If step 212 is false, control adjusts the current physical address in step 220 and control returns to step 208. The physical address may be incremented or decremented by one, incremented or decremented by an offset and/or adjusted using other approaches such as algorithms. If step 212 is true and the capacity of the lookup algorithm is reached, control determines whether the CAM 118 is full in step 224. If step 224 is false, control stores data in the CAM 118 using the input address and returns to step 202. If step 224 is true, control performs error handling in step 225. As can be appreciated, the size of the CAM 118 relative to the input address size and other factors can significantly reduce the statistical likelihood of the number of collisions exceeding the capacity of the lookup algorithm when the CAM is full.

Figure 6:
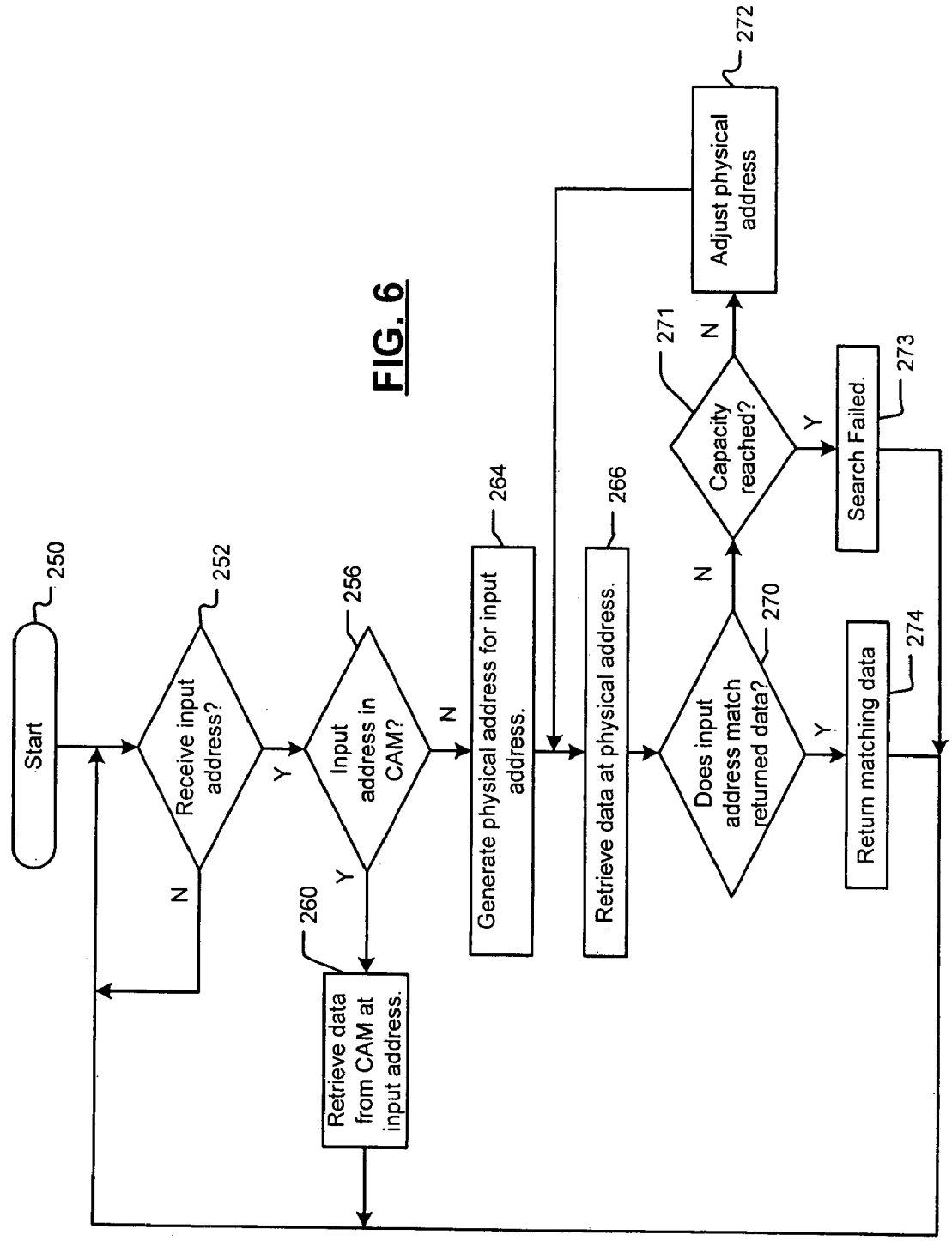
FIG. 6 is a flowchart illustrating lookup steps that are performed by the hybrid memory address lookup device of FIGS. 4A–4C.

Referring now to FIG. 6, steps for retrieving data from the hybrid memory address lookup device 100 based on the input address are shown. Control begins with step 250. In step 252, control determines whether an input address is received. If step 252 is true, control determines whether the input address is located in the CAM 118 in step 256. If step 256 is true, control retrieves data at the input address in the CAM 118 in step 260.

If step 256 is false, control generates the physical address for the input address in step 264. In step 266, control retrieves data at the physical address. In step 270, control determines whether the input address matches the returned data. If step 270 is false, control determines whether capacity of the lookup algorithm has been reached in step 271. If step 271 is false, then the physical address is adjusted in step 272 and control returns to step 266. The physical address may be incremented or decremented by one, incremented or decremented by an offset and/or adjusted using other approaches such as algorithms. If step 271 is true, control declares a failed search in step 273. For example, capacity maybe reached after N failed attempts and/or the tree or trie depth is reached. If step 270 is false, control returns the matching data. As can be appreciated, the CAM lookup steps can also be performed concurrently with the memory lookup steps to save time.

Figure 7:
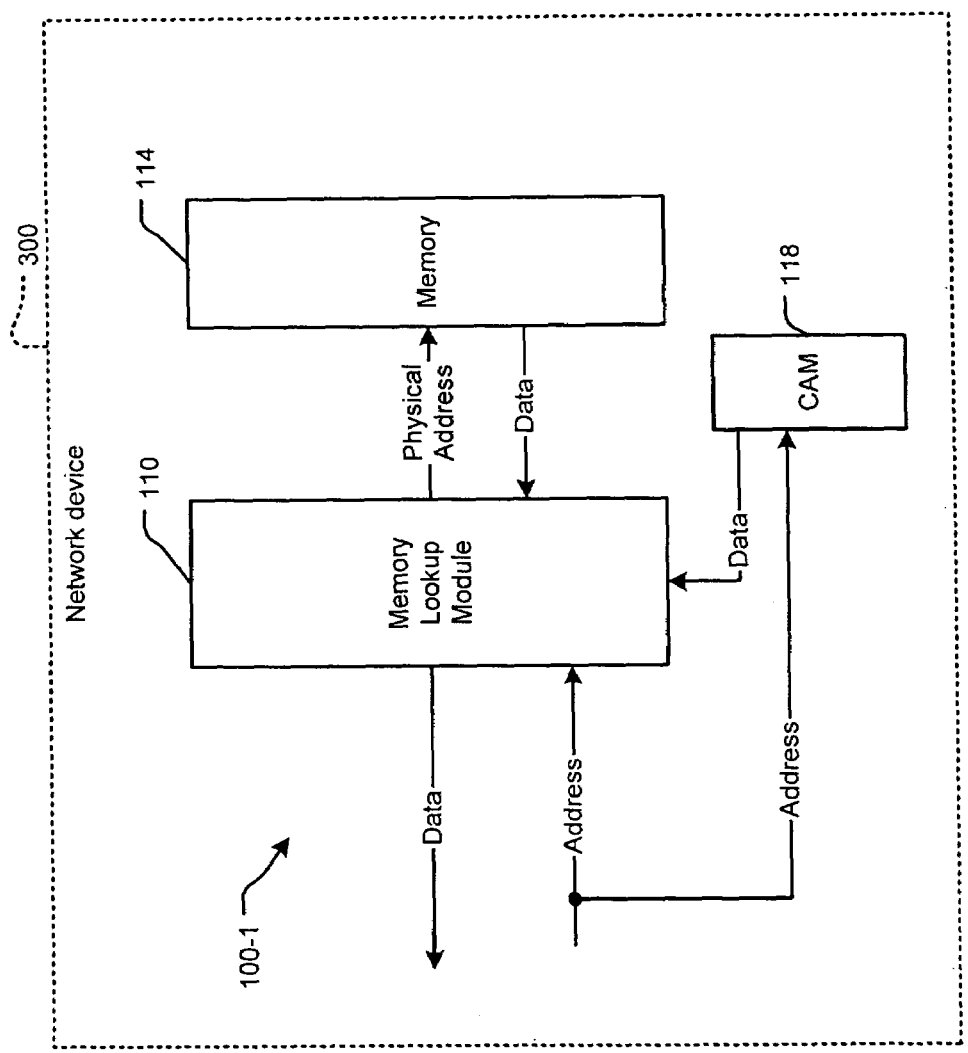
FIG. 7 illustrates a network device including the hybrid memory address lookup device of FIGS. 4A–4C.

Referring now to FIG. 7, a network device 300 such as a switch, router, bridge or other device is shown to include the hybrid memory address lookup device 100-1 according to the present invention. The network device 300 may include the other hybrid memory address lookup devices 100-2 and 100-3. Skilled artisans will appreciate that there a wide variety of other applications for the hybrid memory address lookup device 100. The memory 114 can be SRAM, DRAM, or other suitable electronic memory.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A memory device that stores and retrieves data having an input address, comprising:
    a memory lookup module;
    memory that communicates with said memory lookup module; and
    content addressable memory (CAM) that communicates with said memory lookup module, wherein said memory lookup module attempts to store and/or retrieve said data in at least one of said memory and/or said CAM.

2. The memory device of claim 1 wherein during data storage, said memory lookup module generates physical addresses based on said input address using a lookup algorithm until either a first one of said physical addresses is empty or a capacity of said lookup algorithm is reached.

3. The memory device of claim 2 wherein said if said capacity is reached, said data is stored in said CAM.

4. The memory device of claim 2 wherein if said capacity is not reached, said data is stored in said memory at said first one of said physical addresses.

5. The memory device of claim 2 wherein said capacity is reached when N collisions occur while attempting to store said data in said memory.

6. The memory device of claim 5 wherein said lookup algorithm includes a hash function.

7. The memory device of claim 2 wherein said lookup algorithm includes a tree-based algorithm and wherein said capacity is reached when a depth of said tree is reached.

8. The memory device of claim 2 wherein said lookup algorithm includes a trie-based algorithm and wherein said capacity is reached when a depth of said trie is reached.

9. The memory device of claim 1 wherein during data retrieval, said input address is input to said CAM and said memory lookup module at approximately the same time.

10. The memory device of claim 9 wherein if said CAM does not return matching data, said memory lookup module compares first data from said physical address to said input address and returns said first data if a match occurs.

11. The memory device of claim 10 wherein if said memory lookup module does not find a match between said physical address and said first data, said memory lookup module generates a second physical address and compares second data at said second physical address to said input address and returns said second data if a match occurs.

12. The memory device of claim 11 wherein if said memory lookup module does not find a match between said input address and said second data, said memory lookup module generates additional physical addresses and compares additional data at said additional physical addresses to said input address until a match occurs or a capacity of a lookup algorithm of said memory lookup module is reached.

13. The memory device of claim 11 wherein said memory lookup module at least one of increments said physical address, decrements said physical address, adjusts said physical address using an offset, and adjusts said physical address using an algorithm when said match does not occur.

14. The memory device of claim 1 wherein said memory includes at least one of DRAM and SRAM.

15. A network device comprising the memory device of claim 1.

16. The network device of claim 15 wherein said input address includes a destination address and wherein said data includes a next hop destination address.

17. The network device of claim 15 wherein said network device includes at least one of a switch, a router and a bridge.

18. The memory device of claim 1 wherein said memory lookup module includes a hash generating module that uses a hash function to generate a physical address based on said input address.

19. The memory device of claim 1 wherein said memory lookup module uses a tree data structure to generate a physical address based on said input address.

20. The memory device of claim 1 wherein said memory lookup module uses a trie data structure to generate a physical address based on said input address.

21. A method for storing data associated with an input address in memory, comprising:
   a) generating a physical address from an input address using a lookup algorithm having a capacity;
   b) storing data at said physical address if data is not already stored at said physical address in memory;
   c) adjusting said physical address to a new physical address if data is already stored at said physical address in said memory;
   d) storing said data at said new physical address if data is not already stored at said new physical address in said memory;
   e) repeating steps c) and d) until one of said data is stored in said memory or said capacity is reached;
   f) if said capacity is reached, attempting to store said data in content addressable memory (CAM) at said input address.

22. The method of claim 21 further comprising checking whether said CAM is full prior to step f).

23. The method of claim 21 further comprising using a hash function to generate said physical address based on said input address, wherein said capacity is reached when N collisions occur.

24. The method of claim 21 further comprising using a trie data structure to generate said physical address based on said input address, wherein said capacity is reached when a depth of said trie is reached.

25. The method of claim 21 further comprising using a tree data structure to generate said physical address based on said input address, wherein said capacity is reached when a depth of said tree is reached.

26. A method for retrieving data from a memory device using an input address, comprising:
   a) using said input address to access a content addressable memory (CAM);
   b) returning data at said input address of said CAM if a match occurs; and
   c) if a match does not occur, using said input address to generate a physical address, retrieving data from memory at said physical address, comparing said data to said input address, and returning said data if a match occurs.

27. The method of claim 26 further comprising:
   d) adjusting said physical address to a new physical address if a match does not occur;
   e) retrieving data at said new physical address; and
   f) comparing said data to said input address.

28. The method of claim 27 further comprising repeating steps d) to f) until one of a match occurs or a capacity of a lookup algorithm is reached.

29. A memory device that stores and retrieves data having an input address, comprising:
   memory lookup means for generating a physical address based on said input address;
   storing means for storing data and that communicates with said memory lookup means; and
   content addressable storing means for storing data and that communicates with said memory lookup means, wherein said memory lookup means attempts to store and/or retrieve said data in at least one of said storing means and said content addressable means.

30. The memory device of claim 29 wherein during data storage, said memory lookup means one of generates physical addresses based on said input address using a lookup algorithm until either a first one of said physical addresses is empty or a capacity of said lookup algorithm is reached.

31. The memory device of claim 30 wherein said if said capacity is reached, said data is stored in said content addressable storing means.

32. The memory device of claim 30 wherein if said capacity is not reached, said data is stored in said storing means at said physical address.

33. The memory device of claim 30 wherein said capacity is reached after N collisions occur while attempting to store said data in said storing means.

34. The memory device of claim 33 wherein said lookup algorithm includes a hash function.

35. The memory device of claim 30, wherein said lookup algorithm includes a tree-based algorithm and wherein said capacity is reached when a depth of said tree is reached.

36. The memory device of claim 30 wherein said lookup algorithm includes a trie-based algorithm and wherein said capacity is reached when a depth of said trie is reached.

37. The memory device of claim 29 wherein during data retrieval, said input address is input to said content addressable storing means and said memory lookup means at approximately the same time.

38. The memory device of claim 37 wherein if said content addressable storing means does not return matching data, said memory lookup means compares first data from said physical address to said input address and returns said first data if a match occurs.

39. The memory device of claim 38 wherein if said memory lookup means does not find a match between said physical address and said first data, said memory lookup means generates a second physical address and compares second data at said second physical address to said input address and returns said second data if a match occurs.

40. The memory device of claim 39 wherein if said memory lookup means does not find a match between said input address and said second data, said memory lookup means generates additional physical addresses and compares additional data at said additional physical addresses to said input address until a match occurs or a capacity of a lookup algorithm of said memory lookup means is reached.

41. The memory device of claim 39 wherein said memory lookup means at least one of increments said physical address, decrements said physical address, adjusts said physical address using an offset, and adjusts said physical address using an algorithm when said match does not occur.

42. The memory device of claim 29 wherein said storing means includes at least one of DRAM and SRAM.

43. A network device comprising the memory device of claim 29.

44. The network device of claim 43 wherein said input address includes a destination address and wherein said data includes a next hop destination address.

45. The network device of claim 43 wherein said network device includes at least one of a switch, a router and a bridge.

46. The memory device of claim 29 wherein said memory lookup means uses a hash function and said input address to generate said physical address.

47. The memory device of claim 29 wherein said memory lookup means uses a tree data structure and said input address to generate said physical address.

48. The memory device of claim 29 wherein said memory lookup means further uses a trie data structure and said input address to generate said physical address.

49. A software method for storing data associated with an input address in memory, comprising:
  a) generating a physical address from an input address using a lookup algorithm having a capacity;
  b) storing data at said physical address if data is not already stored at said physical address in memory;
  c) adjusting said physical address to a new physical address if data is already stored at said physical address in said memory;
  d) storing said data at said new physical address if data is not already stored at said new physical address in said memory;
  e) repeating steps c) and d) until one of said data is stored in said memory or said capacity is reached;
  f) if said capacity is reached, attempting to store said data in content addressable memory (CAM) at said input address.

50. The software method of claim 49 further comprising checking whether said CAM is full prior to step f).

51. The software method of claim 49 further comprising using a hash function to generate said physical address based on said input address, wherein said capacity is reached when N collisions occur.

52. The software method of claim 49 further comprising using a trie data structure to generate said physical address based on said input address, wherein said capacity is reached when a depth of said trie is reached.

53. The software method of claim 49 further comprising using a tree data structure to generate said physical address based on said input address, wherein said capacity is reached when a depth of said tree is reached.

54. A software method for retrieving data from a memory device using an input address, comprising:
  a) using said input address to access a content addressable memory (CAM);
  b) returning data at said input address of said CAM if a match occurs; and
  c) if a match does not occur, using said input address to generate a physical address, retrieving data from memory at said physical address, comparing said data to said input address, and returning said data if a match occurs.

55. The software method of claim 54 further comprising:
  d) adjusting said physical address to a new physical address if a match does not occur;
  e) retrieving data at said new physical address; and
  f) comparing said data to said input address.

56. The software method of claim 55 further comprising repeating steps d) to f) until one of a match occurs or a capacity of a lookup algorithm is reached.

* * * * *

UNITED STATES PATENT AND TRADEMARK OFFICE
CERTIFICATE OF CORRECTION

PATENT NO.       : 7,266,635 B1
APPLICATION NO.  : 10/896730
DATED            : September 4, 2007
INVENTOR(S)      : Eitan Medina It is certified that error appears in the above-identified patent and that said Letters Patent is hereby corrected as shown below:

Column 2, Line 40    Delete "one" after "in"
Column 5, Line 66    Delete "maybe" and insert -- may be --
Column 6, Line 9     Insert -- is -- after "there"
Column 6, Line 37    Delete "said" after "wherein"
Column 8, Line 31    Delete "said" after "wherein"

Signed and Sealed this

Eighteenth Day of December, 2007

JON W. DUDAS
*Director of the United States Patent and Trademark Office*